United States Patent
Yoon et al.

(10) Patent No.: US 11,258,305 B2
(45) Date of Patent: Feb. 22, 2022

(54) WIRELESS POWER TRANSMITTING APPARATUS AND WIRELESS POWER TRANSMITTING METHOD

(71) Applicant: SEMES CO., LTD., Cheonan-si (KR)

(72) Inventors: Ki Sub Yoon, Hwaseong-si (KR); Man Gyu Lee, Daegu (KR)

(73) Assignee: SEMES CO., LTD., Cheonan-si (KR)

( * ) Notice: Subject to any disclaimer, the term of this patent is extended or adjusted under 35 U.S.C. 154(b) by 0 days.

(21) Appl. No.: 16/910,972

(22) Filed: Jun. 24, 2020

(65) Prior Publication Data
US 2020/0412179 A1    Dec. 31, 2020

(30) Foreign Application Priority Data

Jun. 27, 2019    (KR) .......... 10-2019-0076809

(51) Int. Cl.
*H02J 50/12*    (2016.01)
*H02J 50/80*    (2016.01)

(52) U.S. Cl.
CPC .............. *H02J 50/12* (2016.02); *H02J 50/80* (2016.02)

(58) Field of Classification Search
CPC .......... H02J 50/00; H02J 50/005; H02J 50/12; H02J 50/80; H02J 50/90
USPC ....................................... 307/104
See application file for complete search history.

(56) References Cited

U.S. PATENT DOCUMENTS 4,204,129 A * 5/1980 Hutchins, Jr. ............ H01B 7/30
174/102 R

FOREIGN PATENT DOCUMENTS

| JP | 11-155245 | 6/1999 |
| JP | 2012-039849 | 2/2012 |
| KR | 10-2015-0006499 | 1/2015 |

OTHER PUBLICATIONS

Korean Office Action, with English translation, corresponding to Korean Application No. 10-2019-0076809, dated Jul. 2, 2020.

* cited by examiner

*Primary Examiner* — William Hernandez
(74) *Attorney, Agent, or Firm* — Kile Park Reed & Houtteman PLLC

(57) ABSTRACT

A wireless power transmitting apparatus includes an AC power supplying unit being configured to supply a AC power for a vehicle of being configured to move along a travel track, a power cable coupling the vehicle and the AC power supplying unit to each other, the power cable transferring the power from the AC power supplying unit to the vehicle and a capacitance controlling unit provided on the power cable, the capacitance controlling unit having a variable capacitance value according to a length of the power cable to maintain a value of the resonance frequency constant. Therefore, the value of the resonance frequency may be kept constant irrespective of the length of the power cable.

19 Claims, 5 Drawing Sheets

WIRELESS POWER TRANSMITTING APPARATUS AND WIRELESS POWER TRANSMITTING METHOD

CROSS-REFERENCE TO RELATED APPLICATION

The present application claims priority from Korean Patent application No. 2019-0076809, filed on Jun. 27, 2019 and all the benefits accruing therefrom under 35 U.S.C. § 119, the contents of which are incorporated by reference in their entirety.

TECHNICAL FIELD

The present disclosure relates to a wireless power transmitting apparatus and a wireless power transmitting method. More particularly, the present disclosure relates to a wireless power transmitting apparatus being configured to receive power through a power supplying cable of being arranged along a travel rail and being movable along the travel rail.

BACKGROUND

In processes of manufacturing semiconductor devices, a device such as a wafer, a printed circuit board (PCB), an individualized semiconductor chip, and a semiconductor package may be transported through an unmanned transferring system such as a rail guided vehicle (RGV), an overhead hoist transferring (OHT) apparatus, and the like. In particular, the OHT apparatus may include a plurality of transport vehicles configured to be movable along a travel rail installed on a ceiling of a clean room. A power supply part may provide power for the transport vehicles through a power supply cable installed along the travel rail by a wireless power transmission way.

A wireless power transmitting apparatus may be used to supply power in order to achieve the wireless power transmission way. Here, a power source may use a fixed value of a resonance frequency at, for example, 9.72 Mhz.

For example, the travel rail may be divided into a plurality of sections for supplying power for the transport vehicles. A power cable for supplying power for the transport vehicles may be installed in each of the sections and arranged along the travel rail. The power cable installed in each of the sections may be connected to a power supply part, respectively. In addition, a length of the travel rail may vary depending on each of manufacturing equipments.

As the length of the power cable is changed, it may be required to maintain the fixed value of the resonance frequency constant by changing a capacitance value or a inductance value of the power supply cable. For example, if the power cable is a relatively long, the capacitance value of the power cable can be changed. Alternatively, when the power cable is relatively short, an inductance value of the power cable may be increased by additionally connecting an inductor in series.

In order to change either the capacitance value or the inductance value, it may be required for an operator to work additionally. Accordingly, it may be necessary to take a lot of time and effort for installing or changing the wireless power transmitting apparatus.

SUMMARY

The present invention provides a wireless power transmitting apparatus capable of achieving a variable value of capacitance according to a length of a power cable.

The present invention provides a wireless power transmitting method capable of achieving a variable value of capacitance according to a length of a power cable.

According to example embodiments of the present invention, a wireless power transmitting apparatus includes an AC power supplying unit being configured to supply a AC power for a vehicle of being configured to move along a travel track, a power cable coupling the vehicle and the AC power supplying unit to each other, the power cable transferring the power from the AC power supplying unit to the vehicle and a capacitance controlling unit provided on the power cable, the capacitance controlling unit having a variable capacitance value according to a length of the power cable to maintain a value of the resonance frequency constant.

In an example embodiment, the capacitance controlling unit may include a variable capacitance part.

Here, the variable capacitance part may include at least one pair of a capacitor and a switch being configured to selectively couple the capacitor to the power cable.

Further, a plurality of capacitors may be operatively connected in parallel with each other.

In an example embodiment, a switching unit is further provided to be coupled to the capacitance controlling unit, the switching unit being configured to turn on/off the switch.

In an example embodiment, the capacitance controlling unit may further include a variable inductance part coupled to the variable capacitance part.

Here, the variable inductance part may include at least one pair of an inductor and a switch being configured to be in series coupled to the capacitor.

Further, a plurality of capacitors may be operatively connected in series with each other.

Furthermore, a pair of the switch and the capacitor may be coupled in parallel with each other, a switching unit may be further provided to be coupled to the capacitance controlling unit, the switching unit being configured to turn on/off the switch.

In an example embodiment, a measuring sensor may be further provided to be coupled to the power cable, the measuring sensor being configured to measure a value of the inductance which varies according to a length of the power cable.

According to example embodiments of the present invention, a wireless power transmitting method is disclosed a length of a power cable provided to transmit power to the transport vehicle is confirmed. Then, a capacitance value of a capacitance controlling unit provided on the power cable and connected between the transport vehicle and an AC power supplying unit according to the length of the power cable is adjusted to maintain a value of a resonance frequency constant. Then, power is provided from the AC power supplying unit to the transport vehicle via the power cable using the resonance frequency value.

In an example embodiment, adjusting the capacitance value of the capacitance controlling unit may includes utilizing a variable capacitance part included in the capacitance controlling unit.

Here, utilizing the variable capacitance part included in the capacitance controlling unit may include selectively connecting at least one capacitor to the power cable by turn on/off at least one switch operatively connected in parallel to the capacitor.

Here, the switch and the capacitor may be coupled in series to form a pair of at least one capacitor-switch.

Further, selectively connecting at least one capacitor to the power cable by turn on/off at least one switch operatively connected in parallel to the capacitor may include sequentially increasing a number where switches turn on.

In an example embodiment, adjusting the capacitance value of the capacitance controlling unit may further includes utilizing a variable inductance part coupled in parallel to the variable capacitance part.

Here, utilizing the variable inductance part may include selectively connecting at least one inductor to the power cable by turn on/off at least one switch operatively connected in parallel to the inductor.

In an example embodiment, a plurality of capacitors may be operatively connected in series with each other and a plurality of switches each operatively coupled in parallel to each of the capacitors to define a pair of a switch-capacitor, wherein utilizing the variable capacitance part may include changing a value of the capacitance by turning on/off each of the switches.

In an example embodiment, measuring sensor a value of the inductance may includes utilizing a measuring sensor being configured to measure the value of the inductance which varies according to the length of the power cable.

According to example embodiments of the present invention, a wireless power transmitting apparatus includes an AC power supplying unit being configured to supply a AC power for a vehicle of being configured to move along a travel track, a power cable coupling the vehicle and the AC power supplying unit to each other, the power cable transferring the power from the AC power supplying unit to the vehicle and a capacitance controlling unit provided on the power cable, the capacitance controlling unit having a variable capacitance value according to a length of the power cable to maintain a value of the resonance frequency uniform, wherein the capacitance controlling unit includes a plurality of capacitors coupled in parallel to each other, and a plurality of switches being configured to selectively couple each of the capacitors to the power cable.

According to the example embodiments of the present disclosure as described above, the wireless power transmitting apparatus is provided with a capacitance controlling unit being configured to adjust the capacitance value according to the length of the power cable. As a result, the wireless power transmitting apparatus can maintain a fixed resonance frequency value constant without additional manipulation of the operator.

In addition, the measuring sensor for measuring an inductance value according to the length of the power cable is additionally provided, so that the capacitance controlling unit can adjust the inductance value easily.

The above summary of the present disclosure is not intended to describe each illustrated embodiment or every implementation of the present disclosure. The detailed description and claims that follow more particularly exemplify these embodiments.

BRIEF DESCRIPTION OF THE DRAWINGS

Example embodiments can be understood in more detail from the following description taken in conjunction with the accompanying drawings, in which.

DETAILED DESCRIPTION

Figure 1:
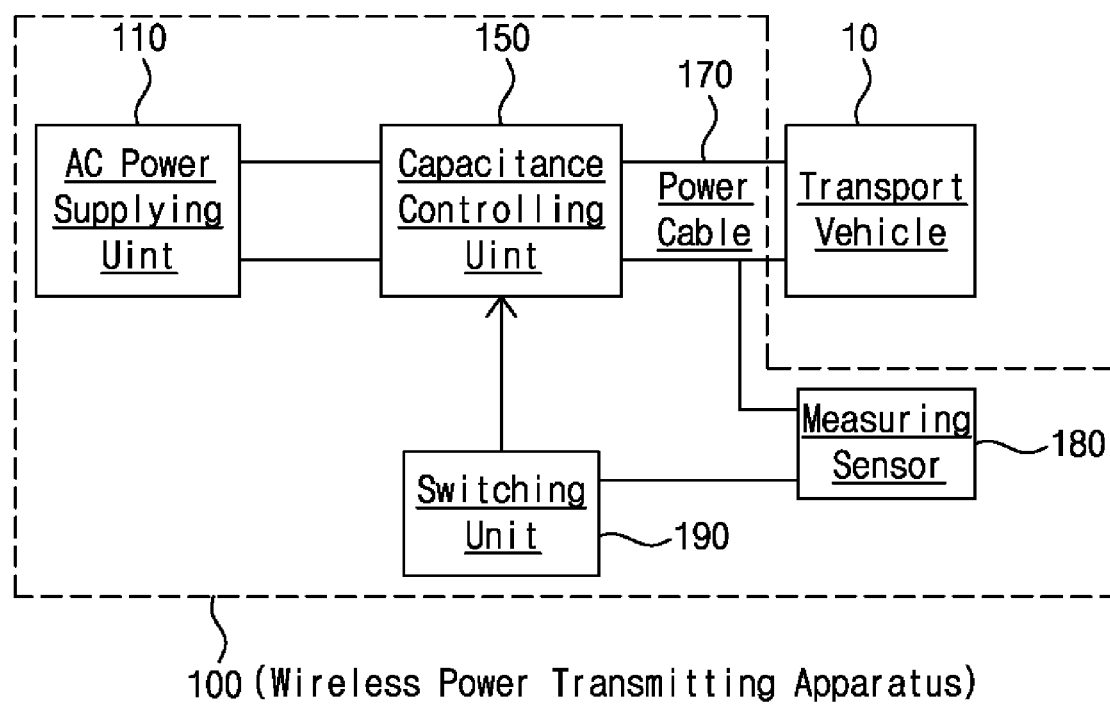
FIG. 1 is a block diagram illustrating a wireless power transmitting apparatus in accordance with an example embodiment of the present disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

Hereinafter, specific embodiments on a raceway unit and an OHT having the same will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout. In the figures, the dimensions of layers and regions are exaggerated for clarity of illustration.

The terms such as first, second, etc., can be used in describing various elements, but the above elements by the above terms should not be limited. The above terms are one element from the other used only to distinguish. For example, in the present invention without departing from the scope of the first component to the second component may be named similarly, the second component to the first component also can be named.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a wireless power transmitting apparatus in accordance with an example embodiment of the present disclosure.

Referring to FIG. 1, a wireless power transmitting apparatus 100 according to an example embodiment of the present discloses includes a power cable 170, an AC power supplying unit 110, and a capacitance controlling unit 150. The wireless power transmitting apparatus 100 may supply power to a transport vehicle configured to be movable along a track. The wireless power transmission apparatus supplies power to the transport vehicle in a wireless power transmission method at a fixed value of a resonance frequency. The resonance frequency value includes, for example, 9.74 kHz or 9.92 kHz. The wireless power transmitting method may include a high-performance induction power transmission method.

The power cable 170 extends along a track. The power cable 170 may have an adjusted length according to a length of the track. For example, if a specific manufacturing facility has a relatively large area, the length of the track may be about 30 to 75 m. Thus, the power cable 170 may have the relatively long length. As a result, the wireless power transmitting apparatus 100 includes the power cable 170 having a relatively high inductance value.

The AC power supplying unit 110 is connected to an end of the power supply cable 170. The AC power supplying unit 110 may include a rectifier (not shown) and an oscillator (not shown). Accordingly, the AC power supplying unit 110 may generate AC power having a specific value of a resonance frequency.

The capacitance controlling unit 150 is provided on the power cable 170. The capacitance controlling unit 150 may be provided on a line of the power cable 170.

The capacitance controlling unit 150 is provided to have a variable capacitance value. That is, as the power cable 170 is longer, the power cable 170 may have a higher value of an inductance, the capacitance controlling unit 150 may be required to reduce the value of a capacitance in order for the wireless power transmitting apparatus 100 to maintain a value of the resonance frequency uniform. A circuit for implementing the capacitance controlling unit 150 may be in detail described with respect to FIGS. 2 and 3.

In an example embodiment, the capacitance controlling unit 150 may have a variable value of an inductance. That is, the capacitance controlling unit 150 may be provided therein with a plurality of inductors which may be operatively connected to each other.

In an example embodiment, a switching unit 190 may be additionally provided. The switching unit 190 may control a switch include in the capacitance controlling unit 150. Thus, the wireless power transmitting apparatus 100 may keep the value of the resonance frequency uniform.

In an example embodiment, a measuring sensor 180 may be further included for measuring an inductance value of the wireless power transmitting apparatus 100 which varies according to the length of the power cable 110. Accordingly, either the inductance value or the capacitance value of the capacitance adjusting unit 150 may be adjusted, depending on the measured value of inductance. For example, the measuring sensor 180 include an LCR meter.

According to example embodiment of the present disclosure, the wireless power transmitting apparatus 100 includes a capacitance adjusting unit 150 such that the capacitance value may be adjusted according to the length of the power cable 110. As a result, the wireless power transmitting apparatus 100 may keep the value of resonance frequency constant without additional manipulation of an operator.

Figure 2:
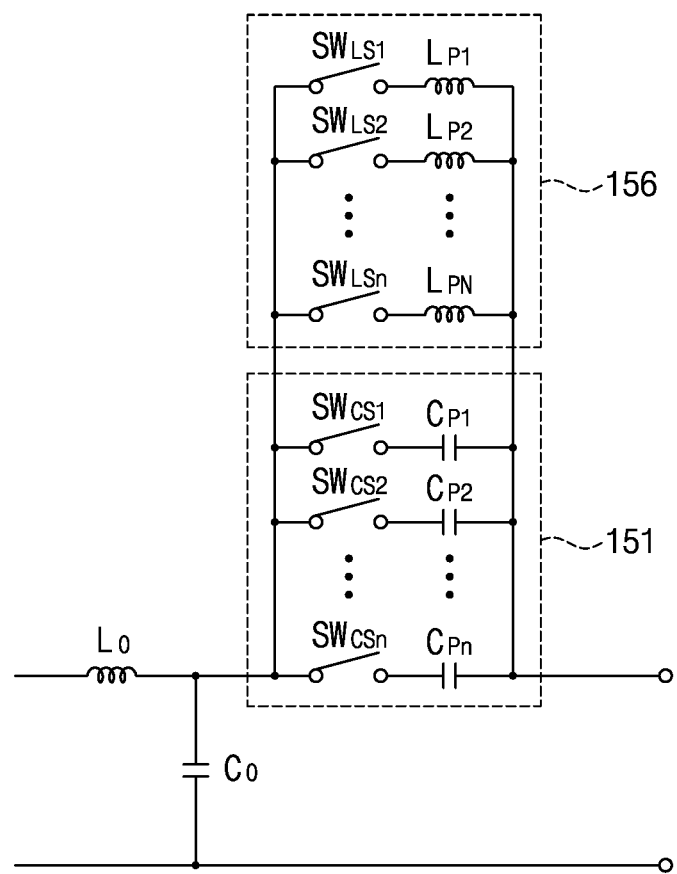
FIG. 2 is a circuit diagram illustrating one example of a capacitance controlling part as shown in FIG. 1.

FIG. 2 is a circuit diagram illustrating one example of a capacitance controlling part as shown in FIG. 1.

Referring to FIGS. 1 and 2, the capacitance controlling unit 150 includes a variable capacitance part 151 that may achieve a variable capacitance value.

The variable capacitance part 151 includes a plurality of capacitors $Cp_1$, $Cp_2$ to Cpn and a plurality of switches $SWcs_1$, $SWp_2$ to SWpn being configured to selectively connect each of the capacitors $Cp_1$, $Cp_2$ to Cpn to the power cable 110.

Here, each of the capacitors $Cp_1$, $Cp_2$ to Cpn is connected to operate in parallel with each other. Further, the first to n-th capacitors $Cp_1$, $Cp_2$ to Cpn are connected in parallel to each other using a plurality of switches $SWcs_1$, $SWcs_2$ to SWcsn. Here, n is a natural number of 3 or more. The value of the variable capacitance may increase as a number of the capacitors $Cp_1$, $Cp_2$ to Cpn which are connected in parallel to one another increases. Conversely, as the number of the capacitors $Cp_1$, $Cp_2$ to Cpn which are connected in parallel to one another decreases, the value of the variable capacitance may decrease.

As a result, the value of the variable capacitance may be changed according to the number of the capacitors $Cp_1$, $Cp_2$ to Cpn which are connected in parallel with one another.

Here, each of the switches $SWcs_1$, $SWcs_2$ to SWcsn and each of the capacitors $Cp_1$, $Cp_2$ to Cpn are operably connected in series to define a pair. the first to n-th switches $SWcs_1$, $SWcs_2$ to SWcsn may turn on/off each of the capacitors $Cp_1$, $Cp_2$ to Cpn corresponding to each other, respectively. Here, n is a natural number of 3 or more.

Accordingly, the capacitors $Cp_1$, $Cp_2$ to Cpn may be in parallel connected to or disconnected from the power cable 170 according to an on/off switching operation of each of the switches $SWcs_1$, $SWcs_2$ to SWcsn.

The switching unit 190 may selectively turn on/off each of the switches $SWcs_1$, $SWcs_2$ to SWcsn. Accordingly, the switching unit 190 may control each of the switches $SWcs_1$, $SWcs_2$ to SWcsn by supplying an on/off signal to each of the switches $SWcs_1$, $SWcs_2$ to SWcsn.

The capacitance controlling unit 150 may further include a variable inductance part 156 that may achieve a variable inductance value.

The variable inductance part 156 includes a plurality of inductors $Lp_1$, $Lp_2$ to Lpn and a plurality of switches $SWcs_1$, $SW_Ls_2$ to $SW_L$sn being configured to selectively connect each of the inductors $Lp_1$, $Lp_2$ to Lpn to the power cable 110.

Here, each of the inductors $Lp_1$, $Lp_2$ to Lpn is selectively connected to operate in parallel with each other. Further, the first to n-th inductors $Lp_1$, $Lp_2$ to Lpn are connected in parallel to each other using the plurality of switches $SWcs_1$, $SW_Ls_2$ to $SW_L$sn. Here, n is a natural number of 3 or more. The value of the variable inductance may decrease as a number of the inductors $Lp_1$, $Lp_2$ to Lpn which are connected in parallel to one another increases. Conversely, as the number of the inductors $Lp_1$, $Lp_2$ to Lpn which are connected in parallel to one another decrease, the value of the variable inductance may increase.

As a result, the value of the variable inductance may be changed according to the number of the inductors $Lp_1$, $Lp_2$ to Lpn which are connected in parallel with one another.

Here, each of the switches $SWcs_1$, $SW_Ls_2$ to $SW_L$sn and each of the inductors $Lp_1$, $Lp_2$ to Lpn are operably connected in series to define a pair. the first to n-th switches $SWcs_1$, $SW_Ls_2$ to $SW_L$sn may turn on/off each of the inductors $Lp_1$, $Lp_2$ to Lpn corresponding to each other, respectively. Here, n is a natural number of 3 or more.

For example, if a manufacturing equipment is occupied with a relatively small area, the track may be less than 30 m long. Thus, the power cable 110 may be a relatively short. Accordingly, the wireless power transmission apparatus 100 including the shot power cable 110 may have a relatively low inductance value.

In this case, the variable inductance value part 156 may compensate for the low inductance value such that the capacitance controlling unit 150 may keep the inductance value constant.

Figure 3:
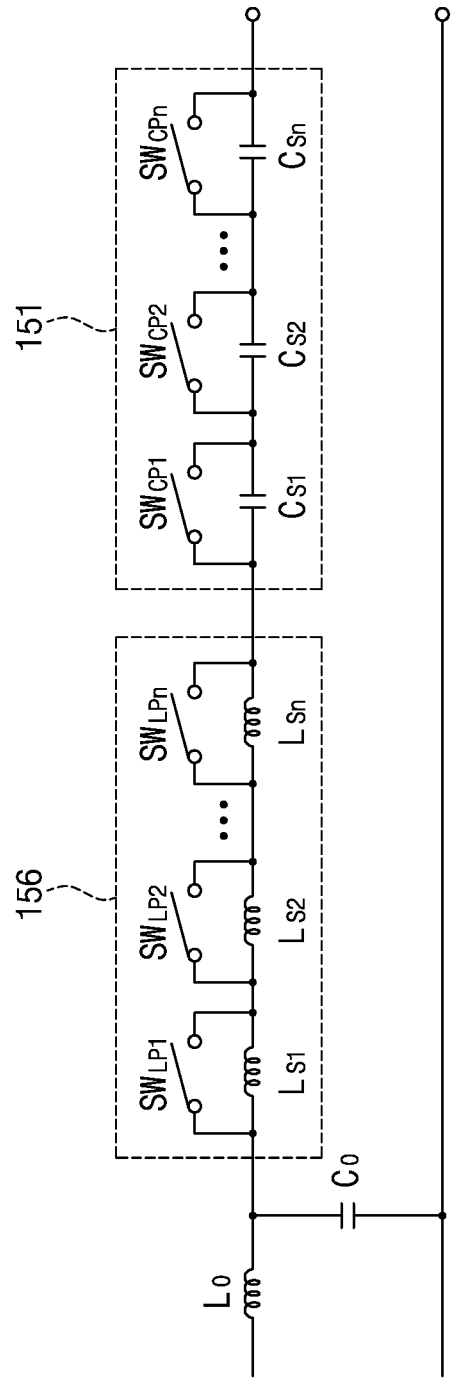
FIG. 3 is a circuit diagram illustrating another example of a capacitance controlling part as shown in FIG. 1.

FIG. 3 is a circuit diagram illustrating another example of a capacitance controlling part as shown in FIG. 1.

Referring to FIGS. 1 and 3, the capacitance controlling unit 150 includes a variable capacitance part 151 that may achieve a variable capacitance value.

The variable capacitance part 151 includes a plurality of capacitors $Cp_1$, $Cp_2$ to $Cpn$ and a plurality of switches $SWcs_1$, $SWp_2$ to $SWpn$ being configured to selectively connect each of the capacitors $Cp_1$, $Cp_2$ to $Cpn$ to the power cable 110.

Here, each of the capacitors $Cp_1$, $Cp_2$ to $Cpn$ is connected to operate in serial with each other. Further, the first to n-th capacitors $Cp_1$, $Cp_2$ to $Cpn$ are connected in serial to each other using a plurality of switches $SWcs_1$, $SWcs_2$ to $SWcsn$. Here, n is a natural number of 3 or more. The value of the variable capacitance may decrease as a number of the capacitors $Cp_1$, $Cp_2$ to $Cpn$ which are connected in serial to one another increases. Conversely, as the number of the capacitors $Cp_1$, $Cp_2$ to $Cpn$ which are connected in parallel to one another decreases, the value of the variable capacitance may increase.

As a result, the value of the variable capacitance may be changed according to the number of the capacitors $Cp_1$, $Cp_2$ to $Cpn$ which are connected in parallel with one another.

Here, each of the switches $SWcs_1$, $SWcs_2$ to $SWcsn$ and each of the capacitors $Cp_1$, $Cp_2$ to $Cpn$ are operably connected in parallel to define a pair. The first to n-th switches $SWcs_1$, $SWcs_2$ to $SWcsn$ may turn on/off each of the capacitors $Cp_1$, $Cp_2$ to $Cpn$ corresponding to each other, respectively. Here, n is a natural number of 3 or more.

Accordingly, the capacitors $Cp_1$, $Cp_2$ to $Cpn$ may be in series connected to or disconnected from the power cable 170 according to an on/off switching operation of each of the switches $SWcs_1$, $SWcs_2$ to $SWcsn$ such that the variable capacitance part 151 may have a variable value of the capacitance.

The switching unit 190 may selectively turn on/off each of the switches $SWcs_1$, $SWcs_2$ to $SWcsn$. Accordingly, the switching unit 190 may control each of the switches $SWcs_1$, $SWcs_2$ to $SWcsn$ by supplying an on/off signal to each of the switches $SWcs_1$, $SWcs_2$ to $SWcsn$.

In an example embodiment, the capacitance controlling unit 150 may further include a variable inductance part 156 that may achieve a variable value of an inductance.

The variable inductance part 156 may be coupled in serial to the variable capacitance part 151.

The variable inductance part 156 includes at least one pair of an inductor $Lp_1$ and a switch $SW_Ls_1$ coupled in serial to the inductor $Lp_1$. The variable inductance part 156 may include a plurality of pairs having the inductor and a switch, which are connected in parallel to one another.

The variable inductance part 156 may include a plurality of inductors $Lp_1$, $Lp_2$ to $Lpn$ and a plurality of switches $SW_Ls_1$, $SW_Ls_2$ to $SW_Lsn$ being configured to selectively connect each of the inductors $Lp_1$, $Lp_2$ to $Lpn$ to the power cable 110.

Here, each of the inductors $Lp_1$, $Lp_2$ to $Lpn$ is selectively connected to operate in series with each other. Further, the first to n-th inductors $Lp_1$, $Lp_2$ to $Lpn$ are connected in series to each other using the plurality of switches $SW_Ls_1$, $SW_Ls_2$ to $SW_Lsn$.

Figure 4:
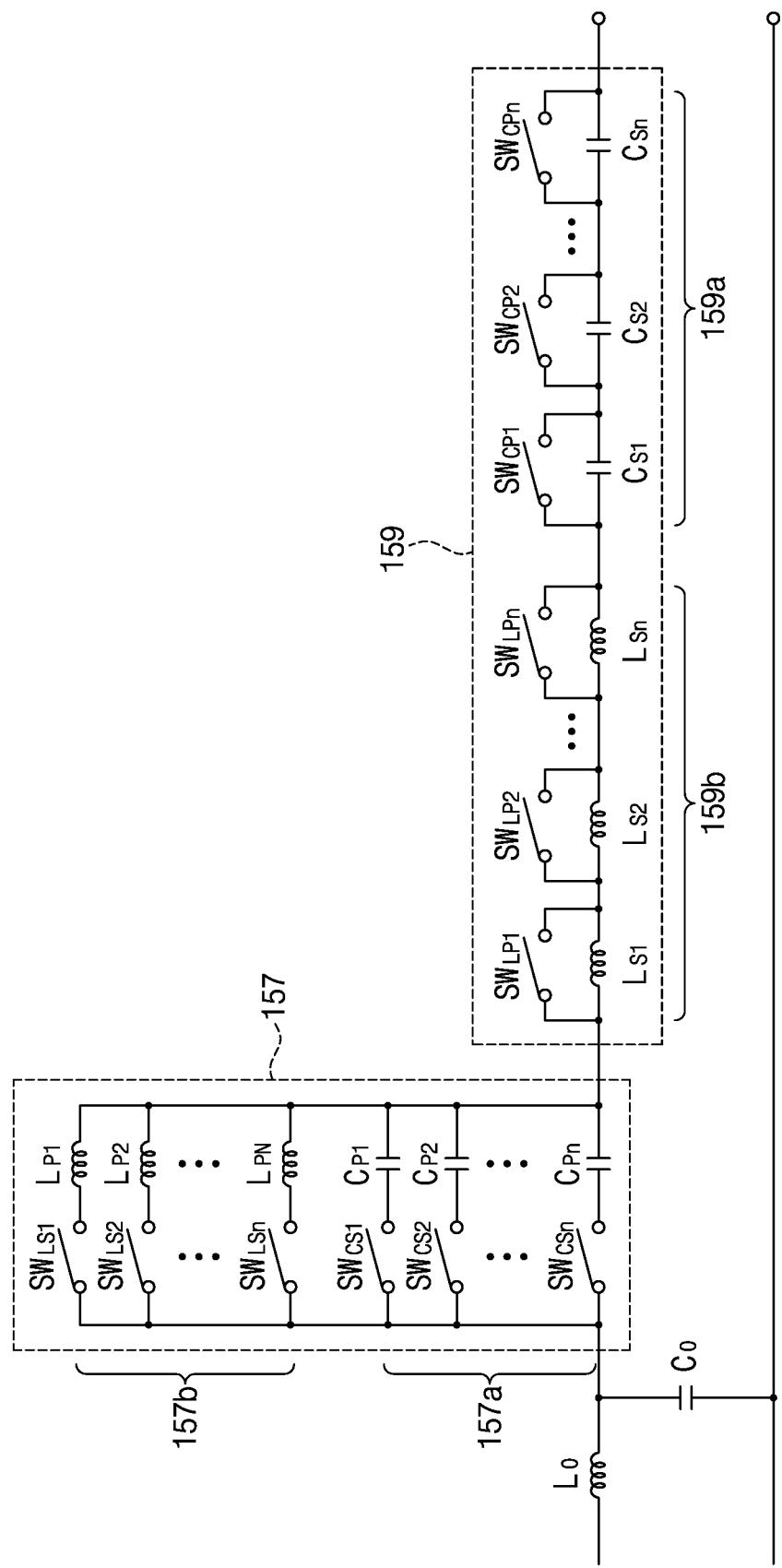
FIG. 4 is a circuit diagram illustrating still another example of a capacitance controlling part as shown in FIG. 1.

FIG. 4 is a circuit diagram illustrating still another example of a capacitance controlling part as shown in FIG. 1.

Referring to FIGS. 1 and 4, the capacitance controlling unit 150 may have a variable capacitance value.

the capacitance controlling unit 150 includes a parallel coupling part 157 and a serial coupling part 159.

The parallel coupling part 157 includes a variable capacitance portion 157a and a variable inductance portion 157b. The variable capacitance portion 157a includes at least pair of a capacitors $Cp_1$ and a switch $SWcs_1$ coupled in series to the capacitor $Cp_1$. A plurality of capacitor-switch pairs may be in parallel coupled to each other. The variable inductance portion 157b includes at least pair of an inductor $Lp_1$ and a switch $SW_Ls_1$ coupled in series to the capacitor $Lp_1$. A plurality of inductor-switch pairs may be in parallel coupled to each other.

On the other hand, the serial coupling part 159 includes a variable capacitance portion 159a having variable capacitance values and a variable inductance portion 159b. The variable capacitance unit 159a may include a plurality of pairs of switches and capacitors connected in parallel to each other. The plurality of pairs of switches and capacitors are coupled in series with each other. Further, the variable inductance portion 159b includes at least one pair of the switch and the inductor connected in parallel to each other. The plurality of pairs of switches and capacitors are coupled in series with each other are connected to each other.

Figure 5:
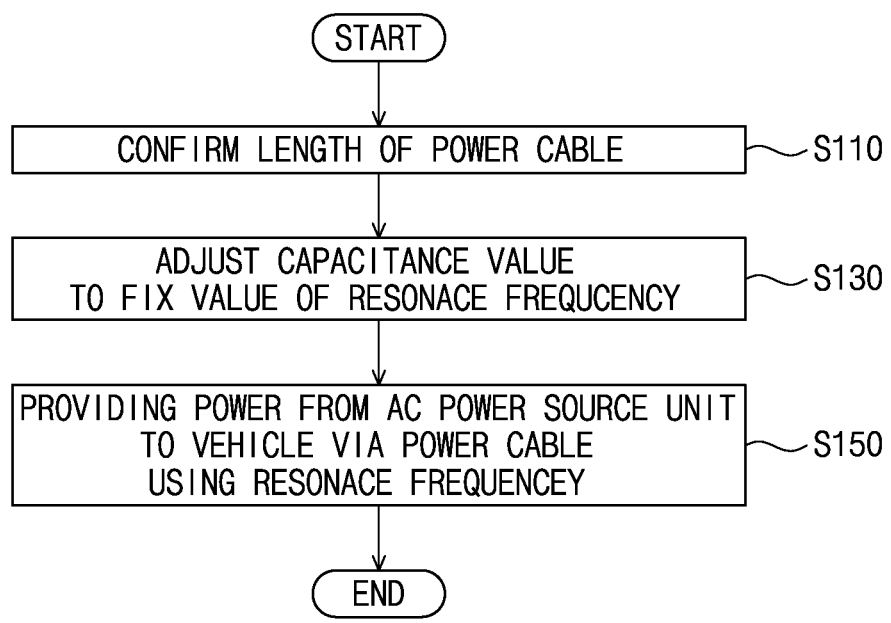
FIG. 5 is a flow chart illustrating a wireless power transmitting method in accordance with an example embodiment of the present disclosure.

FIG. 5 is a flow chart illustrating a wireless power transmitting method in accordance with an example embodiment of the present disclosure.

Referring to FIGS. 1, 2 and 5, a wireless power transmitting method in accordance with an example embodiment of the present disclosure is disclosed. A length of a power cable provided to transmit power to the transport vehicle is confirmed S110.

A measuring sensor 180 being configured to measure the value of the inductance which varies according to the length of the power cable 170.

Then a capacitance value of a capacitance controlling unit 150 is adjusted S130. The capacitance controlling unit 150 is provided on the power cable 170 and connected between the transport vehicle 10 and an AC power supplying unit 110 according to the length of the power cable 170 to maintain a value of a resonance frequency constant.

The capacitance controlling unit 150 is provided to have a variable capacitance value. That is, as the power cable 170 is longer, the power cable 170 may have a higher value of an inductance, the capacitance controlling unit 150 may be required to reduce the value of a capacitance in order for the wireless power transmitting apparatus 100 to maintain a value of the resonance frequency uniform.

In order to adjust the capacitance value of the capacitance controlling unit 150 a variable capacitance part 151 included in the capacitance controlling unit 150 may be utilized.

The variable capacitance part 151 may include at least one pair of a capacitor and a switch.

The variable capacitance part 151 has elements identical to that described with respect to FIGS. 1 to 4. Thus, further description on the variable capacitance part 151 is omitted in order to avoid redundancy.

In order to connecting at least one capacitor to the power cable by turn on/off at least one switch operatively connected in parallel to the capacitor, switches sequentially turn on to increase a number where switches turn on.

Referring to FIGS. 1, 2 and 5 the variable capacitance part 151 is provide with a plurality of capacitors operatively connected in series with each other and a plurality of switches each operatively coupled in parallel to each of the capacitors to define a pair of a switch-capacitor.

Here, the variable capacitance part 151 may changes value of the capacitance by turning on/off each of the switches.

Then, power is provided from the AC power supplying unit 110 to the transport vehicle 10 via the power cable 170 using the constant resonance frequency value.

Although the wireless power transmitting apparatus and the wireless power transmitting method have been described with reference to specific embodiments, they are not limited thereto. Therefore, it will be readily understood by those skilled in the art that various modifications and changes can be made thereto without departing from the spirit and scope of the present disclosure defined by the appended claims.

The invention claimed is:

1. A wireless power transmitting apparatus comprising:
an AC power supplying unit being configured to supply an AC power for a vehicle being configured to move along a travel track;
a power cable coupling the vehicle and the AC power supplying unit to each other, the power cable transferring the power from the AC power supplying unit to the vehicle; and
a capacitance controlling unit provided on the power cable, the capacitance controlling unit having a variable capacitance value according to a length of the power cable to maintain a value of a resonance frequency constant.

2. The wireless power transmitting apparatus of claim 1, wherein the capacitance controlling unit includes a variable capacitance part.

3. The wireless power transmitting apparatus of claim 2, wherein the variable capacitance part includes at least one pair of a capacitor and a switch being configured to selectively couple the capacitor to the power cable.

4. The wireless power transmitting apparatus of claim 3, wherein a plurality of capacitors is operatively connected in parallel with each other.

5. The wireless power transmitting apparatus of claim 3, further comprising a switching unit coupled to the capacitance controlling unit, the switching unit being configured to turn on/off the switch.

6. The wireless power transmitting apparatus of claim 3, wherein a plurality of capacitors is operatively connected in series with each other.

7. The wireless power transmitting apparatus of claim 6, wherein a pair of the switch and the capacitor is coupled in parallel with each other,
further comprising a switching unit coupled to the capacitance controlling unit, the switching unit being configured to turn on/off the switch.

8. The wireless power transmitting apparatus of claim 2, wherein the capacitance controlling unit further includes a variable inductance part coupled to the variable capacitance part.

9. The wireless power transmitting apparatus of claim 8, wherein the variable inductance part includes at least one pair of an inductor and a switch being configured to be operatively coupled in series to each other.

10. The wireless power transmitting apparatus of claim 1, further comprising a measuring sensor coupled to the power cable, the measuring sensor being configured to measure a value of the inductance which varies according to a length of the power cable.

11. A wireless power transmitting method comprising:
confirming a length of a power cable provided to transmit power to a transport vehicle;
adjusting a capacitance value of a capacitance controlling unit provided on the power cable and connected between the transport vehicle and an AC power supplying unit according to the length of the power cable, to maintain a value of a resonance frequency constant; and
supplying power from the AC power supplying unit to the transport vehicle via the power cable using the resonance frequency value.

12. The method of claim 11, wherein adjusting the capacitance value of the capacitance controlling unit includes utilizing a variable capacitance part included in the capacitance controlling unit.

13. The method of claim 12, wherein utilizing the variable capacitance part included in the capacitance controlling unit includes selectively connecting at least one capacitor to the power cable by turning on/off at least one switch operatively connected in parallel to the capacitor.

14. The method of claim 13, wherein the switch and the capacitor are coupled in series to form a pair of at least one capacitor-switch.

15. The method of claim 12, wherein adjusting the capacitance value of the capacitance controlling unit further includes utilizing a variable inductance part coupled in parallel to the variable capacitance part.

16. The method of claim 15, wherein utilizing the variable inductance part includes selectively connecting at least one inductor to the power cable by turning on/off at least one switch operatively connected in parallel to the inductor.

17. The method of claim 12, wherein a plurality of capacitors is operatively connected in series with each other and a plurality of switches each operatively coupled in parallel to each of the capacitors to define a pair of a switch-capacitor,
wherein utilizing the variable capacitance part includes changing a value of the capacitance by turning on/off each of the switches.

18. The method of claim 11, wherein confirming a length of a power cable includes utilizing a measuring sensor being configured to measure a value of an inductance which varies according to the length of the power cable.

19. A wireless power transmitting apparatus comprising:
an AC power supplying unit being configured to supply an AC power for a vehicle being configured to move along a travel track;
a power cable coupling the vehicle and the AC power supplying unit to each other, the power cable transferring the power from the AC power supplying unit to the vehicle; and
a capacitance controlling unit provided on the power cable, the capacitance controlling unit having a variable capacitance value according to a length of the power cable to maintain a value of the resonance frequency uniform,
wherein the capacitance controlling unit includes a plurality of capacitors coupled in parallel to each other, and a plurality of switches being configured to selectively couple each of the capacitors to the power cable.

* * * * *